US009581305B2

(12) United States Patent
Petker

(10) Patent No.: US 9,581,305 B2
(45) Date of Patent: Feb. 28, 2017

(54) METHOD FOR THE ARRANGEMENT OF A RETAINING RING ON A REFLECTOR

(71) Applicant: Hella KGaA Hueck & Co., Lippstadt (DE)

(72) Inventor: Waldemar Petker, Bünde (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 17 days.

(21) Appl. No.: 14/259,292

(22) Filed: Apr. 23, 2014

(65) Prior Publication Data

US 2014/0313759 A1 Oct. 23, 2014

(30) Foreign Application Priority Data

Apr. 25, 2013 (DE) ........................ 10 2013 104 187

(51) Int. Cl.
*B60Q 1/00* (2006.01)
*F21S 8/10* (2006.01)

(52) U.S. Cl.
CPC ...... *F21S 48/1113* (2013.01); *Y10T 29/49947* (2015.01)

(58) Field of Classification Search
CPC .................................... F21S 48/1104–48/1122
USPC .......................................................... 362/519
See application file for complete search history.

(56) References Cited

U.S. PATENT DOCUMENTS

| | | | | | |
|---|---|---|---|---|---|
| 4,764,854 | A * | 8/1988 | Matsune | ............. | F21S 48/1113 362/227 |
| 4,794,500 | A * | 12/1988 | Bradley | ............... | F21S 48/1113 362/267 |
| 5,938,323 | A | 8/1999 | McMahan | | |
| 6,082,883 | A | 7/2000 | Tatsumi et al. | | |

FOREIGN PATENT DOCUMENTS

| | | | |
|---|---|---|---|
| DE | 19922298 | A1 | 12/2000 |
| DE | 10009589 | A1 | 9/2001 |
| DE | 4334719 | B4 | 7/2004 |
| EP | 900974 | A2 | 3/1999 |

* cited by examiner

*Primary Examiner* — Sean Gramling
(74) *Attorney, Agent, or Firm* — Husch Blackwell LLP

(57) ABSTRACT

A method for the arrangement of a retaining ring (10) for holding a light source in the opening (11) of a reflector (12) for a vehicle headlamp. The retaining ring (10) extends in a plane and is arranged on the back side flush with the opening (11) on the reflector (12). For the arrangement of the retaining ring (10) of the reflector (12), a molded retainer part (13) is arranged on the reflector (12) and a recess (14) is formed in the retaining ring (10). The retaining ring (10) is placed on the reflector (12), so that the molded retainer part (13) is guided through the recess (14), after which the retaining ring (10) is turned in the plane of its extent about the molded retainer part (13), so that the retaining ring (10) clamps on the molded retainer part (13).

10 Claims, 2 Drawing Sheets

METHOD FOR THE ARRANGEMENT OF A RETAINING RING ON A REFLECTOR

CROSS REFERENCE

This application claims priority to German Patent Application No. 10 2013 104187.6 filed Apr. 25, 2013, and hereby incorporates this document by reference.

TECHNICAL FIELD OF THE INVENTION

The present invention relates to a method for the arrangement of a retaining ring for holding a light source in the opening of a reflector for a vehicle headlamp, wherein the retaining ring extends in a plane and is arranged on the back side flush with the opening of the reflector. The invention further relates to the arrangement of the retaining ring for holding a light source in the opening of the reflector for a vehicle headlamp.

BACKGROUND OF THE INVENTION

A reflector and a light source can form, for example, basic components of a module for providing a low-beam light or a high-beam light in a vehicle headlamp. The vehicle headlamp could also be understood as a general lighting device for a vehicle, for example, as a rear tail lamp. Here it is known to insert the light source in a back-side opening of the reflector, in order to then rotate this light source in the opening over a certain angle range. Here, retaining arms arranged on the light source grip under defined areas of the retaining ring, so that the light source is arranged on the reflector on the back side by the retaining ring like a kind of bayonet coupling. For this, the retaining ring must be arranged on the reflector, for which regular threaded connections are provided. The reflector can be formed in one piece and can have a mounting neck in which the opening for holding the light source is formed. The mounting neck can also be formed as an individual component and connected to the reflector body. For the assembly of the retaining ring on the reflector, the reflector is usually supplied with the opening facing upward on a means of transport, wherein the retaining ring must be placed on the opening for the later fastening to threaded elements.

For the transport of the reflector with the means of transport, for example, with a conveyor belt, vibrations can be introduced into the reflector, wherein these vibrations lead to the placed retaining ring falling onto the top-side opening of the reflector. Here it must be ensured that the retaining ring is precisely positioned on the opening of the reflector for the subsequent, often automatic fastening by the threaded elements. Therefore, if the retaining rings slip or fall down, manual help is needed to place the retaining ring back to its precise position on the opening of the reflector. Here it is disadvantageous to use bonding agents because these require a drying time and it is desirable to secure the retaining ring in position directly after placement on the opening of the reflector, in order to feed the reflector with the placed retaining ring for the subsequent automated fastening process.

As an alternative to the fastening of the retaining ring, there are solutions that involve, for example, a clipping of the retaining ring on the reflector. For example, U.S. Pat. No. 5,938,323 A1 shows a mount for a light source in the opening of a reflector for a vehicle headlamp and a retaining ring for placement on the reflector is provided that has a base body and extends in the plane of a ring. For fastening the retaining ring to the opening of the reflector, the retaining ring has locking clips by means of which the retaining ring can be clipped to the opening of the reflector. The locking clips project perpendicular from the plane of the retaining ring and form barbed hooks so that the locking clips can be clipped into openings formed on the reflector. Retaining rings with barbed hooks are disadvantageous in automated assembly, for example, when the retaining ring is to be automatically gripped by an assembly machine and placed on the opening of the reflector, because when the retaining ring is gripped by the barbed hook, several retaining rings can become hooked together, which would impair an automatic operation.

EP 0 900 974 A2 shows another mount for a light source in the opening of a reflector for a vehicle headlamp and a retaining ring is shown with which the light source is held in the opening of the reflector. The retaining ring has a plurality of expansion elements, holding elements, and fixing tabs that each form undercuts. This likewise prevents or makes automated handling of the retaining rings more difficult.

The mounting neck arranged on the reflector is often formed as a plastic component and is produced using an injection molding method. Here it is desirable to form the mounting neck without undercuts, in order for the injection molding tool to have the simplest possible shape. If the retaining rings have barbed hooks, these must lock into undercuts so that the advantage of a simple injection molding tool cannot be achieved. If the retaining ring is clipped on the mounting neck, with the mounting neck having corresponding geometries, these must usually also be provided with undercuts, so that a clipping of the retaining ring on the reflector also does not form a satisfactory solution.

SUMMARY OF THE INVENTION

The problem of the invention is to create a method for the arrangement of a retaining ring on a reflector that has a simple shape and wherein the reflector and especially a mounting neck on the reflector have the simplest possible shapes and a simple automated handling of the retaining rings is possible.

This problem is solved by a method for the arrangement of a retaining ring on a reflector according to the preamble of Claim 1 in connection with the characterizing features. Furthermore, the problem is solved by an arrangement of such a retaining ring for holding a light source in the opening of a reflector for a vehicle headlamp according to the preamble of Claim 5. Advantageous refinements of the invention are specified in the dependent claims.

The method according to the invention provides for eliminating the previously mentioned disadvantages in that a molded retainer part is arranged on the reflector and a recess is formed in the retaining ring, wherein the retaining ring is placed on the reflector, so that the molded retainer part is guided through the recess, after which the retaining ring is turned in the plane of its extent about the molded retainer part, so that the retaining ring clamps on the molded retainer part.

Through the method for the arrangement of the retaining ring on the reflector according to the invention, the advantage is achieved that, through a clamping formed between the retaining ring and the reflector, the retaining ring generates a clamping force that produces the situation that the retaining ring can no longer fall from the top-side opening of the reflector, and furthermore the retaining ring can also not change in its position over the opening due to the clamped arrangement. An assembler that places the retaining ring manually on the reflector must make sure for moving the retaining ring on the edge of the opening only that the molded retainer part extends through the recess and then the assembler only has to slightly turn the retaining ring in order to generate the clamping and thus to apply the clamping force. If the reflector is transported, for example, over an assembly belt and the reflector reaches a stop, then the applied clamping force between the retaining ring and the reflector ensures that even for a strong vibration of the reflector, the retaining ring does not fall from the reflector or its position does not change on the edge of the opening of the reflector. A subsequent step for the automated fastening of the retaining ring on the reflector can be reliably performed because it ensures that the retaining ring has its target position over the opening of the reflector. The molded retainer part can be shaped in connection with the recess so that the retaining ring assumes its target position only when the clamping and the clamping force are applied, for example, passage holes in the retaining ring are flush with thread holes in the reflector, in order to produce a subsequent fastening.

In an especially advantageous way, when rotating the retaining ring in the plane of its extent, the edge of the recess can cut at least slightly into the material of the molded retainer part. Consequently, a kind of undercut is produced only by the introduced rotation of the retaining ring about the molded retainer part and the molded retainer part can be formed without an undercut, so that a simplified production of the reflector and, in particular, the mounting neck, is enabled on which the retaining ring is arranged.

According to another measure for improving the invention, a molded support part can be arranged on the reflector and a support edge can be arranged on the retaining ring, wherein the support edge is brought into contact on the molded support part with a positive fit at the end of the rotational movement of the retaining ring that is introduced, for example, manually, in the plane of its extent. This prevents a reverse rotation of the retaining ring about the molded retainer part, so that the clamping and consequently the clamping force between the retaining ring and the reflector are maintained. Here, the molded support part can also be formed without an undercut and the support edge on the retaining ring contacts the molded support part only on the side and the contact is maintained because the rotation generates an elastic clamping between the retaining ring and the reflector that generates a reverse torque of the retaining ring about the molded retainer part. In particular, if the molded retainer part is made from a plastic material and the retaining ring is made from a metallic sheet material, this can promote the cutting of the material of the retaining ring into the molded retainer part. Furthermore, the molded retainer part can generate a slightly elastic rebounding through which the retaining ring experiences a reverse torque so that, due to the reverse torque, the molded support part on the reflector remains in contact against the support edge on the retaining edge.

If the retaining ring is pre-fixed on the reflector in the way according to the invention, the retaining ring can be fastened to the reflector by means of threaded elements with another processing step after the arrangement of the retaining ring by the clamping. For inserting the threaded element for the final fastening of the retaining ring to the reflector, an assembly machine can be used. Advantageously, the prefixing of the retaining ring on the reflector according to the invention ensures that the threaded element can be guided through openings in the retaining ring and through screw mounts flush with this ring in the reflector, so that the automatic fastening can be performed without errors.

The invention further relates to an arrangement of a retaining ring for holding a light source in the opening of a reflector for a vehicle headlamp, wherein the retaining ring extends in a plane and is arranged on the back side flush with the opening of the reflector, wherein a molded retainer part is arranged on the reflector and wherein a recess is formed in the retaining ring, wherein the molded retainer part is guided through the recess and wherein the retaining ring is clamped on the molded retainer part by a rotation of the retaining ring in the plane of its extent.

Advantageously, a molded support part can be arranged on the reflector and a support edge can be arranged on the retaining ring, wherein the support edge is brought into contact with the molded support part with a positive fit, so that a reverse turning of the retaining ring about the molded retainer part is prevented. Here, the molded support part can be arranged on the reflector at a distance to the molded retainer part, wherein this distance corresponds, for example, to at least half the diameter of the retaining ring. In this way the advantage is achieved that an assembler can rotate the retaining ring by hand in the plane of its extent about the molded retainer part, without applying large forces for this procedure. Due to the spaced-apart arrangement of the molded support part to the molded retainer part, a lever effect is generated and the distance between the molded retainer part and the area in which the assembler forms the clamping in the retaining ring against the reflector is significantly larger than the lever edges acting against each other on the molded retainer part that extends through the recess in the retaining ring. Consequently, a cutting of the boundary of the recess in the molded retainer part can be generated just with a slight force introduced by hand into the retaining ring, without an assembler having to introduce larger forces into the retaining ring by hand.

In particular, the recess can have a closed contour. This achieves the advantage that the retaining rings can also be provided not in magazines, and the retaining rings can be gripped by an assembly machine, without these being able to become hooked to each other. Through the closed contour of the recess, it is prevented, in particular, that the retaining rings formed from sheet elements can become hooked to each other.

Advantageously, the boundary of the recess can have an elastic area. The elastic area can have a rebounding effect, so that in addition to the elastic or at least slightly plastic deformation of the molded retainer part on the reflector, an elastic deformation of the boundary of the recess can also be generated. In this way the clamping effect can be further improved.

Finally, the reflector can have a mounting neck in which the opening is formed for holding the light source and on which the retaining ring is arranged, wherein the molded retainer part and/or the molded support part is formed on the mounting neck without undercuts. The mounting neck can advantageously be formed from a plastic material and produced in an injection molding process. Because the mounting neck and/or the molded support part is formed without undercuts, the injection molding tool for producing the mounting neck can have a simple design. The mounting neck can be connected to the reflector in an arbitrary way, wherein the mounting neck can also be formed in one piece with the reflector. For example, reflectors are known that are formed from a plastic body and have a metal insert, for example, for generating a reflective inner side. For producing such molded retainer parts that are simultaneously formed integrally with the reflector body, the mounting neck and/or the molded support part can be advantageously formed without any undercuts.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
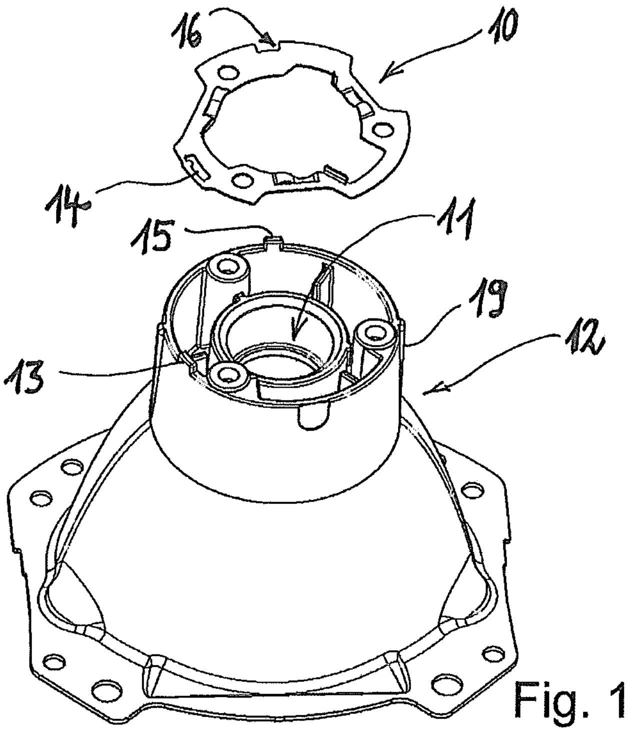
FIG. 1: a perspective view of a reflector and a retaining ring, wherein the retaining ring is shown in an unassembled arrangement at a distance to the reflector.
Figure 2:
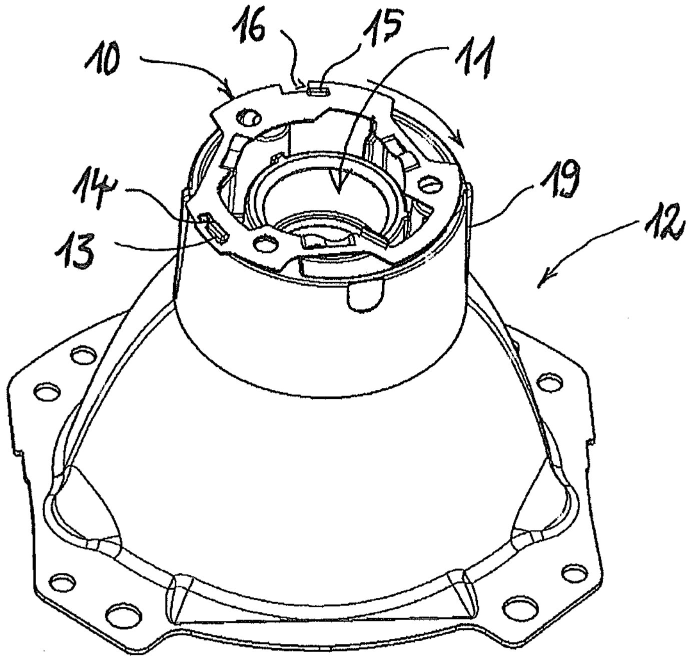
FIG. 2: a perspective view of the reflector according to FIG. 1, wherein the retaining ring is placed on the opening of the reflector such that the molded retainer part is guided through the recess in the retaining ring.
Figure 3A:
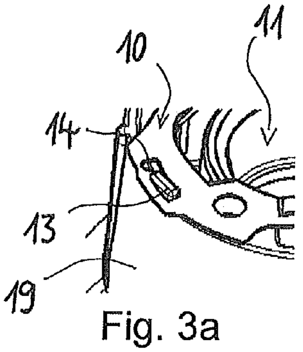
FIG. 3*a*: a detail view of the molded retainer part that extends through the recess in the retaining ring.
Figure 3:
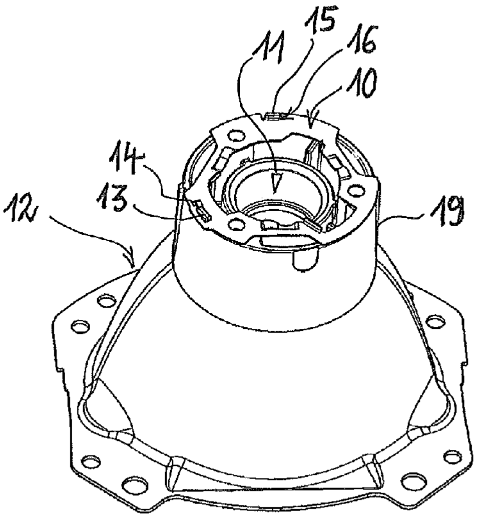
FIG. 3: the arrangement of the retaining ring on the reflector according to FIG. 2, wherein the retaining ring is rotated about the molded retainer part such that a support edge on the retaining ring contacts against a molded support part on the reflector.
Figure 4:
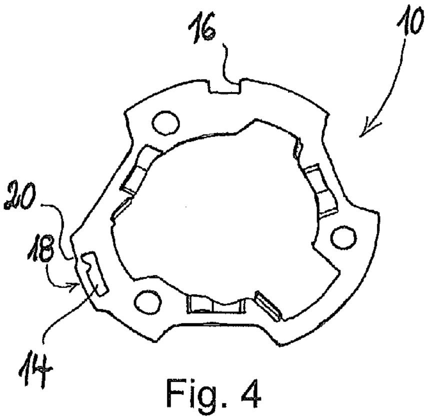
FIG. 4: a perspective view of the retaining ring.

FIGS. 1, 2, 3, and 5 show a reflector 12 on which a retaining ring 10 is arranged with the features according to the invention. Here, FIG. 1 shows the retaining ring 10 in an arrangement spaced apart from the reflector 12; FIG. 2 shows the retaining ring 10 that is already placed on an opening 11 of the reflector 12; FIG. 3 shows the retaining ring 10 in an already turned and thus clamped arrangement on the reflector 12; and FIG. 4 shows the arrangement of the retaining ring 10 on the reflector 12 according to FIG. 3, wherein additional thread elements 17 are inserted by means of which the retaining ring 10 is finally fastened on the reflector 12.

The reflector 12 has a base body on which a mounting neck 19 connects on the back side. The base body of the reflector can be formed, for example, from a metallic body and the mounting neck 19 is formed by a plastic body. The back side of the mounting neck 19 here forms the opening 11 in which a light source can be inserted in a way that is not shown in more detail. The light source can be held on the reflector 12 by the retaining ring 10 in the opening 11 when the retaining ring 10 is arranged on the mounting neck 19 according to FIG. 5 with a threaded connection.

FIG. 1 shows the retaining ring 10 in an arrangement spaced apart from the mounting neck 19 of the reflector 12. In this way, for example, the retaining ring 10 can be held by an assembler, wherein the retaining ring 10 must have an orientation so that the recess 14 is positioned over the molded retainer part 13 on the reflector 12.

FIG. 2 shows the arrangement of the retaining ring 10 on the mounting neck 19 of the reflector 12, wherein the assembler has placed the retaining ring 10 on the opening 11 of the mounting neck 19 such that the molded retainer part 13 extends through the recess 14. Here the molded retainer part 13 can correspond approximately to the dimensions of the recess 14, wherein passing the molded retainer part 13 through the recess 14 can be performed, for example, without force. The view further shows a molded support part 15 that is still located under this in the orientation of the retaining ring 10 and the molded support part 15 is formed with a support edge 16 on the retaining ring 10, formed by a side recess, not yet brought into alignment. The assembler can now turn the retaining ring 10, as this is shown placed on the mounting neck 19 in FIG. 2, in the direction shown by the arrow, so that an arrangement of the retaining ring 10 according to FIG. 3 is produced.

FIG. 3 shows the retaining ring 10 on the mounting neck 19 of the reflector 12 in a clamped arrangement by contacting the molded support part 15 on the mounting neck 19 against the support edge 16 on the retaining ring 10. In this way, the retaining ring 10 is clamped in the recess 14 by the rotation of the molded retainer part 13, so that the molded retainer part 13 is slightly torqued. The molded retainer part 13 is formed integrally with the mounting neck 19 in an injection molding process and thus can be slightly elastic and, in particular, can deform plastically. If the retaining ring 10 has been turned and if the support edge 16 on the retaining ring 10 is already located behind the molded support part 15, then after the rotational movement the assembler must slightly lower the retaining ring 10 in the area of the support edge 16 in which the assembler, for example, manually holds the retaining ring 10, so that the support edge 16 can also reach behind the molded support part 15.

FIG. 3*a* shows a detailed view of the arrangement of the molded retainer part 13 in the recess 14 and the closed edge contour of the recess 14 can cut slightly into the material of the molded retainer part 13 on diametrically opposed areas. Thus the retaining ring 10 is reliably held over the opening 11 of the mounting neck 19.

FIG. 4 finally shows the retaining ring 10 with the recess 14 and the support edge 16 and it can be seen that the recess 14 and the support edge 16 have a greater distance to each other, in order to introduce a greater torque into the molded retainer part 13 just through small retaining forces between the molded support part 15 and the support edge 16. The molded retainer part 13 here has, in particular, an elongated design and, corresponding to the elongated molded retainer part 13, the recess 14 also has an elongated extent. The recess 14 is formed at the edge in the retaining ring 10, so that an elastic area 18 is produced that can flex slightly. In particular, the elastic area 18 with a rib 20 of smaller material thickness is shown and the rib 20 can also be eliminated, so that the elastic area 18 has greater elasticity and thus forms a stronger spring effect. Here it should be ensured that a slot that is formed, for example, in the rib 20, is narrower than the sheet thickness of the retaining ring, so that the retaining ring cannot become hooked in the slot at the position of the rib 20.

Figure 5:
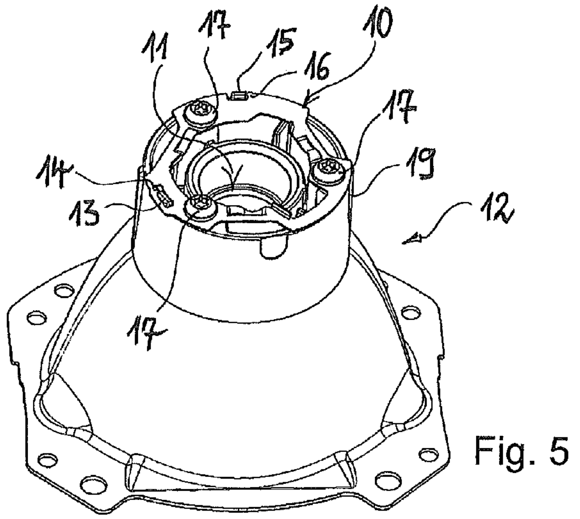
FIG. 5: a perspective view of the reflector with a retaining ring, wherein the retaining ring is fastened with the reflector in its clamped arrangement on the reflector through threaded elements.

FIG. 5 shows finally the arrangement of the retaining ring 10 on the mounting neck 19 of the reflector 12, wherein the retaining ring 10 is finally fastened on the mounting neck 19 with threaded elements 17. In this arrangement, finally a light source can be inserted into the opening 11 and this can be fixed on the retaining ring 10 like a kind of bayonet connection through slight rotation of the light source.

The invention is not limited in its design to the preferred embodiment described above. On the contrary, a number of variants are conceivable that use the solution as represented above, even on designs that are fundamentally different. All of the features and/or advantages, including structural details, spatial arrangements, and processing steps emerging from the claims, the description, or the drawings can be considered essential to the invention both individually and also in different combinations.

LIST OF REFERENCE SYMBOLS

10 Retaining ring
11 Opening
12 Reflector
13 Molded retainer part
14 Recess
15 Molded support part
16 Support edge
17 Threaded element
18 Elastic area
19 Mounting neck
20 Rib

The invention claimed is:

1. A method for the arrangement of a retaining ring for holding a light source in the opening of a reflector for a vehicle headlamp, comprising the steps of:

arranging a molded retainer part on the reflector;

forming a recess and a central opening in the retaining ring, the recess being a through hole, the through hole being separate from the central opening;

placing the retaining ring on the reflector, so that the molded retainer part is guided through the recess; and rotating the retaining ring in its plane about the molded retainer part, so that the retaining ring is clamped to the molded retainer part.

2. A method according to claim 1, wherein when rotating the retaining ring in the plane of its extent, the edge of the recess cuts at least slightly into the material of the molded retainer part.

3. A method according to claim 1 wherein a molded support part is arranged on the reflector and a support edge is arranged on the retaining ring, wherein, at the end of the rotational movement of the retaining ring in its plane of extent, the support edge is brought into contact with the molded support part with a positive fit, so that a reverse rotation of the retaining ring about the molded retainer part is prevented.

4. A method according to one of claim 1 wherein after the arrangement of the retaining ring by the clamping, the retaining ring is fastened on the reflector by means of screw elements.

5. An arrangement of a retaining ring for holding a light source in the opening of a reflector for a vehicle headlamp, the arrangement comprising:

a molded retainer part arranged on the reflector; and a recess and a central opening formed in the retaining ring, the recess being a through hole, the through hole being separate from the central opening, wherein the molded retainer part is guided through the recess and wherein the retaining ring is clamped on the molded retainer part by a rotation of the retaining ring in its plane.

6. The arrangement according to claim 5, wherein a molded support part is arranged on the reflector and a support edge is arranged on the retaining ring, wherein the support edge is brought into contact on the molded support part with a positive fit, so that a reverse rotation of the retaining ring about the molded retainer part is prevented.

7. The arrangement according to claim 5 wherein the molded support part is arranged on the reflector at a distance to the molded retainer part, wherein this distance corresponds to half the diameter of the retaining ring.

8. The arrangement according to claim 5 wherein the recess has a closed contour.

9. The arrangement according to claim 5 wherein the boundary of the recess has an elastic area.

10. The arrangement according to claim 5 wherein the reflector has a mounting neck in which the opening for holding the light source is formed and on which the retaining ring is placed, wherein the molded retainer part and/or the molded support part is formed on the mounting neck without an undercut.

* * * * *